Patented Apr. 26, 1932

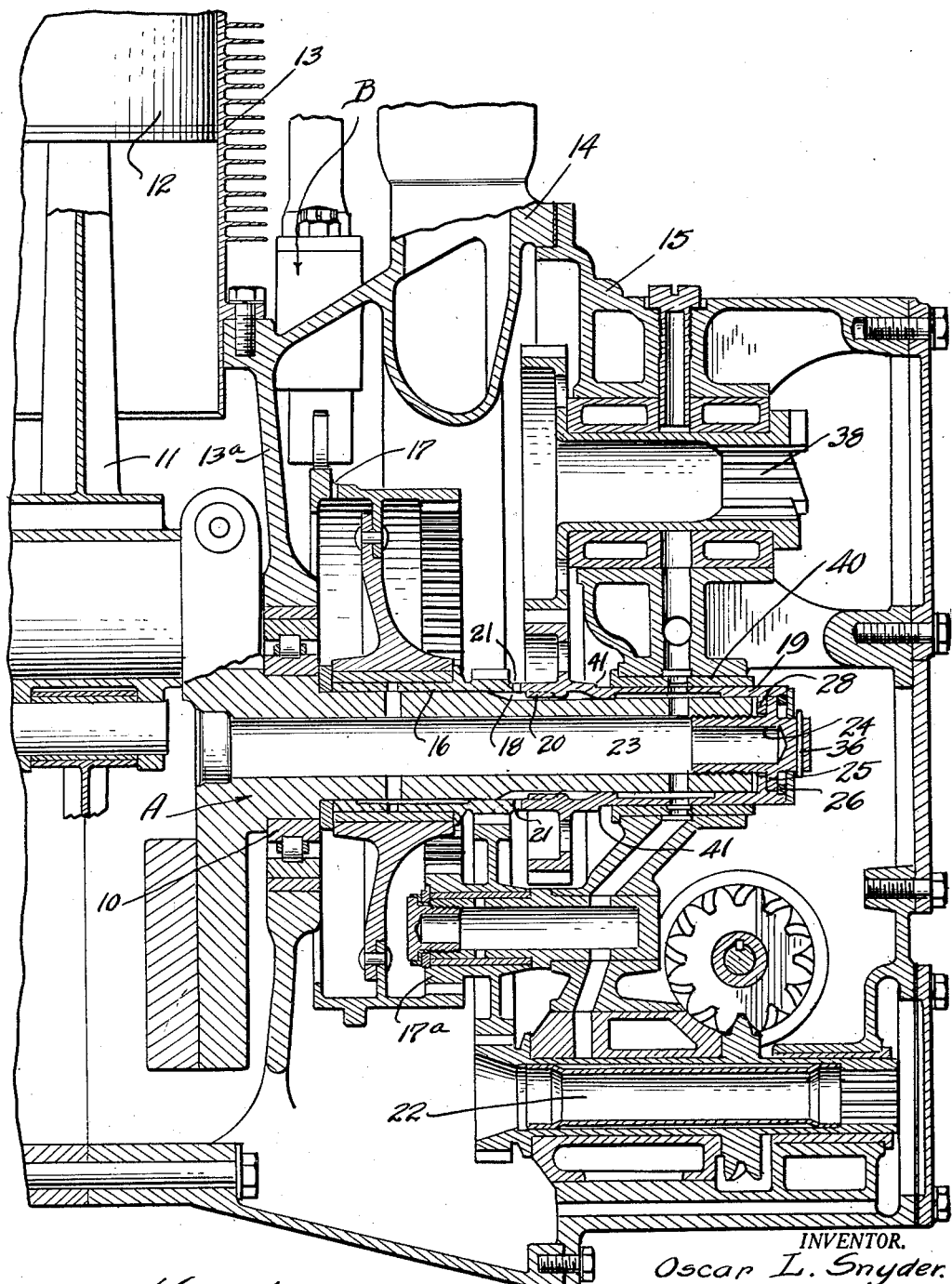

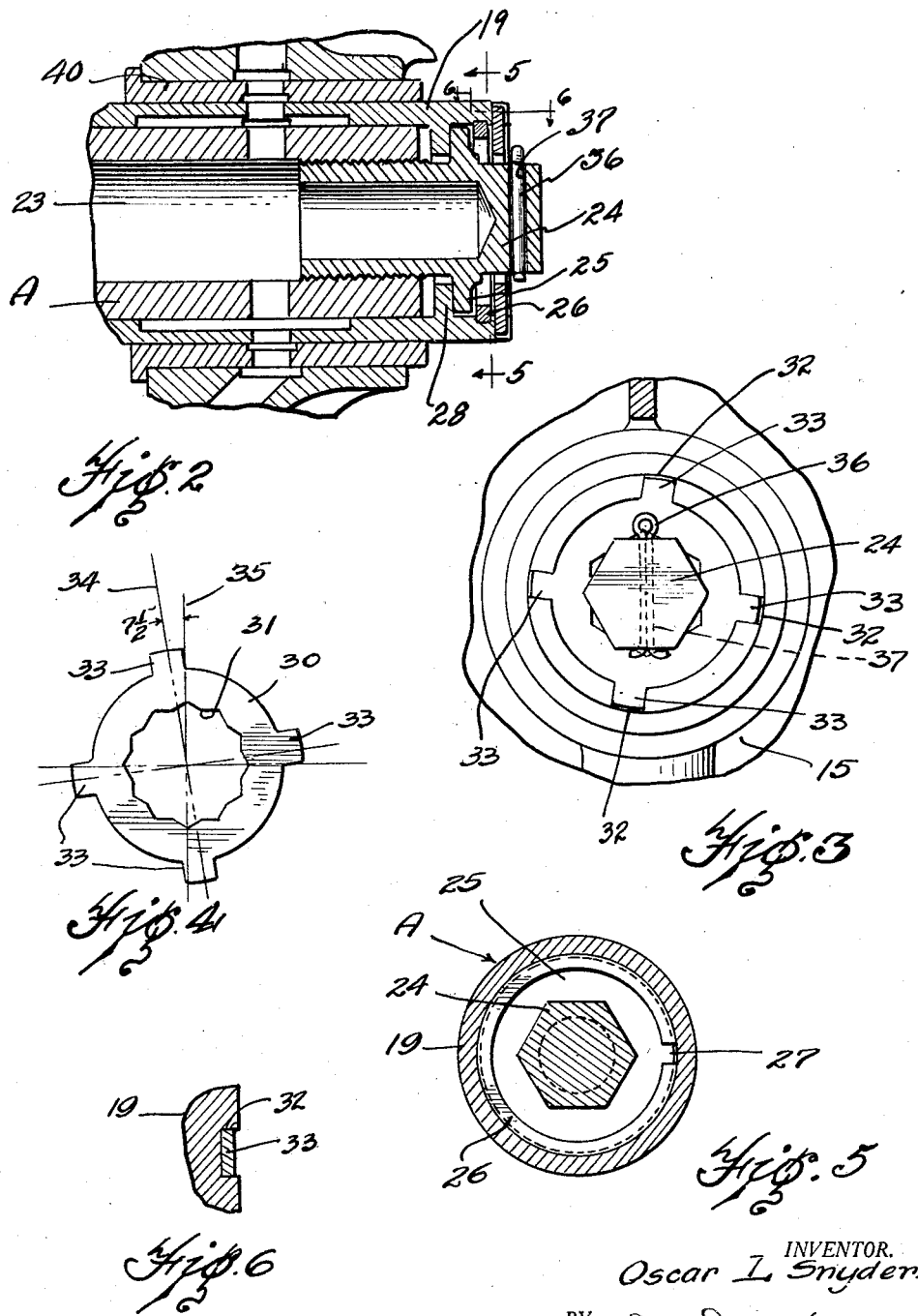

1,855,324

UNITED STATES PATENT OFFICE

OSCAR L. SNYDER, OF MARYSVILLE, MICHIGAN, ASSIGNOR, BY MESNE ASSIGNMENTS, TO CONTINENTAL AIRCRAFT ENGINE COMPANY, A CORPORATION OF DELAWARE

ENGINE

Application filed September 9, 1929. Serial No. 391,147.

This invention relates to internal combustion engines and more particularly to the timing means for timing the valve operating mechanism with respect to the crank shaft, and is especially adapted for use with aircraft engines, though not necessarily limited thereto.

In aircraft engines of the internal combustion type wherein the valve operating mechanism is driven from the crank shaft through a releasable clutch, much difficulty has been experienced in readily disengaging the clutching means for permitting the relative movement between the valve operating mechanism and the crank shaft, when timing the engine.

It is the object of this invention to eliminate these aforementioned difficulties by providing readily accessible means for quite easily and positively disengaging the clutching means intermediate of the crank shaft and the valve operating mechanism, thereby permitting the engine to be accurately timed with a minimum of time and effort.

Another object of the invention is to provide means for locking said clutch releasing means intermediate the valve operating mechanism and the crank shaft for internal combustion engines in a plurality of positions for the purpose of positively aligning these associated engine elements together in operative connection.

A further object of the invention is to facilitate the timing of the valve operating mechanism with respect to the crank shaft by providing means accessible from the end by the crank shaft for releasing the clutching means intermediate the valve operating mechanism and crank shaft, thereby eliminating much of the trouble, and difficulty entailed in releasing the clutching means in most engines of this type.

A still further object of this invention is to further facilitate the timing of internal combustion engines by providing means that permit the valve operating mechanism to be readily moved relative to the crank shaft by operatively connecting an accessory driving mechanism with the valve operating mechanism or crank shaft which may be readily operated to move the said valve operating mechanism with respect to said crank shaft.

For a more detailed understanding of the invention, reference may be had to the accompanying drawings, which illustrate one form which the invention may assume, and in which:

Figure 1 is a vertical sectional view through one end of an internal combustion engine constructed in accordance with my invention;

Figure 2 is an enlarged detailed sectional view of the extracting nut and associated parts for releasing the clutching means;

Figure 3 is an end view of the crank shaft;

Figure 4 is a detail of the lock washer;

Figure 5 is a sectional view taken on the line 5—5 of Figure 2, and

Figure 6 is a detailed sectional view taken on the line 6—6 of Figure 2.

"A" designates the crank shaft of an internal combustion engine supported by the usual type of bearings 10, the connecting rods 11 being attached thereto and to pistons 12 operating in the cylinders 13. A housing 14 is located at one end of the engine and is provided with the inwardly extending arms 13$^a$, which carry the crank shaft bearing 10. An end housing or cover 15 is bolted or otherwise secured to the housing 14.

The crank shaft A is extended into the housings 14 and 15, and a sleeve 16 is rotatably supported on the crank shaft, a cam 17 is operatively connected with said freely rotatable sleeve by gearing 17$^a$ and arranged to be operatively connected with valve mechanism designated as a whole by the reference character B. The crank shaft is splined for a short distance, as at 18, and a second sleeve 19, provided with the internal splined ribs 20 is splined onto the crank shaft A, the two abutting ends of the sleeves being notched or serrated, as at 21, and adapted to cooperate together to operatively connect the same in direct driving relation. A generator driving mechanism 22 is operatively connected to the sleeve 16, while a starting mechanism 38 is operatively connected with the sleeve 19.

The outer end of the crank shaft A is reduced in diameter and is provided with a longitudinal bore 23, that is internally threaded at the end of the crank shaft. An externally threaded nut 24 is screwed into the open internally threaded end of the crank shaft and carries a flange 25 that engages the split ring 26, that is sprung outwardly into the annular recess 27 carried by the sleeve 19. The sleeve 19 also carries the inwardly extending annular rib or flange 28, the flange 25 of the nut being positioned intermediate the split ring 26 and said flange 28. Thus as the nut is retracted the flange 25 will engage the split ring and retract the sleeve 19 longitudinally of the crank shaft and disengage the abutting serrated clutch facings carried by the abutting ends of the sleeves 19 and 16. As the nut is advanced the flange 25 will engage the flange 28 carried by the sleeve 19 and advance the said sleeve into engagement with the sleeve 16, connecting the said sleeves together in direct driving relation.

When the clutching means are engaged, it is desirable to lock the nut against rotation with respect to the sleeve and this is accomplished by providing a lock washer therefor. Preferably the head of the nut is constructed hexagonal in cross-section, though it must be obviously understood that a square, octagonal, or other shaped nut could be used if so desired. A lock washer 30 is provided with a centrally located perforation 31, that is stamped out in the form of a double "hex" (see Fig. 4) thus providing means permitting the washer to be positioned in twelve different positions, precisely 30 degrees apart. The outer end of the sleeve 19 is slotted as at 32 and the washer is provided with the extensions or prongs 33 adapted for engagement with the slots in the sleeve 19. Preferably these extensions 33 and slots 32 are respectively positioned 90 degrees apart, and the centerline 34 between any two diametrically opposite extensions is preferably offset 7½ degrees from the diametric centerline 35 that bisects two diametrically opposite flat portions of the double "hex" perforation (see Figure 4). Thus, by reversing the washer, or turning same through an arc of 180 degrees about the centerline 35 the axis of the extensions or prongs will be revolved and the said extensions will be advanced 15 degrees, thus permitting a finer adjustment of the washer, giving as a net result, an adjustment of 15 degrees or twenty four positions in all. This number of positions could be obtained by providing a triple "hex" perforation, but it is believed that this will not allow sufficient flat bearing surfaces for engagement of the washer with the nut and would not prove as practical. A cotter pin 36 is engaged in the cotter pin hole 37 in the nut and secures the washer in place.

The timing of the engine is accomplished by moving the valve operating mechanism with respect to crank shaft. To time the engine, the clutching means between the two sleeves 16 and 19 is first released by removing the cotter pin and lock washer and then retracting the nut 24. The valve operating mechanism is thus free to move relative to the crank shaft, and this relative movement is produced by manually or otherwise rotating one of the accessory driving mechanisms operatively connected to the sleeve 16, such as the generator driving mechanism 22. When the proper timing is obtained the nut is advanced into the crank shaft which moves the sleeve 19 into juxtaposition with the sleeve 16 and engages the clutching means.

Obviously if so desired, other accessory mechanisms operatively connected to the sleeve 19 and to the crank shaft could be operated when the clutch is released to move the crank shaft relative to the valve operating mechanism, such as the starter driving mechanism 38, though it is found to be more preferable and easier to actually move the valve operating mechanism instead of the crank shaft when timing the engine.

The sleeve 19 is rotatably supported in a bearing 40 carried by the housing 15, the said sleeve having a portion of reduced diameter, which forms a shoulder 41, that is arranged to abut the bearing member 40 rigidly carried by said housing 15, and thus limit the retracting movement of the retractable sleeve 19. Besides serving as a stop, this shoulder on the sleeve and the cooperating abutment carried by the housing 15, also serves as a means for jacking the housing loose from the housing 14. When the bolts 43 that fasten the housing 15 to the housing 14 are removed the housing 15 is free to be removed. By retracting the nut 24 beyond the amount sufficient to clear the clutch portions of the sleeve, the shoulder 41, bearing against the bearing 40, will thrust against the housing 15 and actually jack the same loose from the housing 14.

It will be noted, that the structure herein described and illustrated enables one to very quickly and readily time the engine, because of the fact that access can be had to the clutch releasing means when the cover for the end of the housing 15 is removed. There is no necessity for disturbing the bearing which supports the longitudinally movable sleeve, since the clutch releasing means is accessible at the end of the crank shaft. Furthermore, the clutching means is positively disengaged or engaged. The engine may be very easily and quickly timed because of the simple accessible means provided for moving the valve operating mechanism relative to the crank shaft through the operation of an accessory driving mechanism operatively connected to one of the driving sleeves intermediate of the said crank shaft and said valve operating mechanism.

Although but one form of the invention has been illustrated and but a single application thereof has been described in detail, it will be apparent to those skilled in the art to which the invention pertains, that various modifications and changes may be made therein without departing from the spirit of the invention or from the scope of the appended claims.

What I claim as my invention is:

1. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, and means for positively moving one of the sleeves relative to the other to positively release or engage said clutching means.

2. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, and means for positively moving the second sleeve to positively release or engage said clutching means.

3. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, and means engaging the outer end of said second sleeve to positively move the same with respect to said crank shaft for positively releasing or engaging said clutching means.

4. In an internal combustion engine, the combination of a crank shaft, a sleeve rotatably supported on the crank shaft, a valve operating mechansm operatively connected with said sleeve, a second sleeve keyed to said crank shaft and permitted to move longitudinally thereof, clutching means between said sleeves, and means engaging the outer end of said second sleeve to positively move the same longitudinally with respect to said crank shaft for positively releasing or engaging said clutching means.

5. In an internal combustion engine, the combination of a crank shaft, a sleeve rotatably supported on the crank shaft, a valve operating mechansm operatively connected with said sleeve, a second sleeve keyed to said crank shaft and permitted to move longitudinally thereof, clutching means between said sleeves, and means accessible at the end of the crank shaft and engaging the second sleeve to positively move the same longitudinally with respect to said crank shaft for releasing or engaging said clutching means.

6. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, and readily accessible means carried by said crank shaft and engaging the second sleeve to move the same longitudinally with respect to said crank shaft for releasing or engaging said clutching means.

7. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, and a retractable means operatively connected with said second sleeve and adjustably connected with the crank shaft to move the second sleeve with respect to the crank shaft for releasing or engaging said clutching means.

8. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, and a threaded retracting nut operatively connected with said second sleeve and adjustably threaded onto the end of the crank shaft to move the second sleeve longitudinally with respect to the crank shaft for releasing or engaging said clutching means.

9. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, and a retracting nut operatively connected with one of said sleeves and adjustably connected with said crank shaft for moving the said sleeves relative to each other to release or engage the clutching means.

10. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, means for releasing said clutching means, and accessory driving mechanism operatively connected to one of said sleeves, whereby said driving mechanism may be operated to rotate the sleeve operatively connected therewith relative to the other sleeve to move the valve operating mechanism relative to the crank shaft when the clutch is released to time the engine.

11. In an internal combustion engine, the combination of a crank shaft, a sleeve rotatably supported on the crank shaft, a valve operating mechanism operatively connected with said sleeve, a second sleeve keyed to said crank shaft and permitted to move longitudinally thereof, clutching means between said sleeves, means for releasing said clutching means, and accessory driving mechanism operatively connected to one of said sleeves and which may be manually operated when the clutch is released to rotate the sleeve operatively connected therewith relative to the other sleeve to move the valve operating mechanism relative to the crank shaft to time the engine.

12. In an internal combustion engine the combination of a crank shaft, a sleeve rotatably supported on the crank shaft, a valve operating mechanism operatively connected with said sleeve, a second sleeve splined to said crank shaft and permitted to move longitudinally thereof, clutch means between said sleeves, a retracting nut operatively connected with said second sleeve and adjustably connected with the crank shaft to move the second sleeve with respect to the crank shaft for releasing or engaging said clutching means, and a lock washer provided with a perforation having a plurality of flat surfaces in excess of those carried by the nut to provide means for adjustably engaging the washer with said nut in a plurality of positions, said washer provided with means for engagement with the sleeve operatively connected with said nut to lock the nut to the said sleeve.

13. In an internal combustion engine, the combination of a crank shaft, a sleeve rotatably supported on the crank shaft, a valve operating mechanism operatively connected with said sleeve, a second sleeve splined to said crank shaft and permitted to move longitudinally thereof, clutch means between said sleeves, a retracting nut operatively connected with said second sleeve and adjustably connected with the crank shaft for releasing or engaging said clutching means, and a lock washer provided with means permitting the same to be adjustably connected with the nut in a plurality of equally spaced positions, said washer provided with means offset diametrically with respect to the adjustable nut engaging means and adapted for engagement with the sleeve operatively connected with the nut, whereby the washer may be reversed and thereby located in any of an increased number of positions relative to said nut and sleeve operatively connected therewith to lock said nut to said sleeve in a plurality of relative positions.

14. In an internal combustion engine, the combination of a crank shaft, a sleeve rotatably supported on the crank shaft, a valve operating mechanism operatively connected with said sleeve, a second sleeve splined to said crank shaft and permitted to move longitudinally thereof, clutch means between said sleeves, a retracting nut having a plurality of equal sides operatively connected with said second sleeve and adjustably connected with the crank shaft to move the second sleeve with respect to the crank shaft for releasing or engaging said clutching means, and a lock washer provided with a cut out perforation having double the number of flat edges for engaging the flat sides of the nut, said washer provided with extensions engaging the sleeve operatively connected with said nut and offset diametrically from the diametric centerline bisecting opposite flat edges of the perforation in said washer, the diametric centerline of said extensions offset from said diametric centerline bisecting opposite flat edges one quarter the angular distance between two adjacent diametric centerlines bisecting adjacent flat edges of the perforations in said washer, whereby the washer may be reversed and thereby located in a plurality of positions spaced apart angularly one half the angular distance between two adjacent diametric centerlines bisecting adjacent flat edges of the perforation in said washer.

15. In an internal combustion engine including a crank case housing, the combination of a crank shaft rotatably supported thereby, a sleeve rotatably supported on the crank shaft, a valve operating mechanism operatively connected with said sleeve, a second sleeve having a shoulder and splined to said crank shaft and movable longitudinally thereof, clutching means between said sleeves, and a housing therefor and provided with means for supporting said longitudinally movable sleeve, the shoulder carried by said sleeve arranged to engage said housing to limit the travel of the sleeve.

16. In an internal combustion engine including a crank case housing, the combination of a crank shaft rotatably supported thereby, a sleeve rotatably supported on the crank shaft, a valve operating mechanism operatively connected with said sleeve, a second sleeve having a shoulder and splined to said crank shaft and movable longitudinally thereof, clutching means between said sleeves, a housing therefor provided with means for supporting said longitudinally movable sleeve, means for moving the second sleeve, and removable fastening means for securing said housing to the crank case housing, the shoulder carried by said second sleeve arranged to engage said housing when unfastened and jack the same loose from said crank case housing when said second sleeve is moved through a predetermined distance.

In testimony whereof I affix my signature.

OSCAR L. SNYDER.